(12) United States Patent
Haga et al.

(10) Patent No.: US 6,583,600 B2
(45) Date of Patent: Jun. 24, 2003

(54) BATTERY PACK CHARGING DEVICE

(75) Inventors: Youichi Haga, Kanagawa (JP); Michihito Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/265,924

(22) Filed: Oct. 7, 2002

(65) Prior Publication Data

US 2003/0085686 A1 May 8, 2003

(30) Foreign Application Priority Data

Oct. 9, 2001 (JP) ........................................ 2001-311984

(51) Int. Cl.[7] .................................................. H02J 7/00
(52) U.S. Cl. ....................................................... 320/110
(58) Field of Search ................................. 320/103–110

(56) References Cited

U.S. PATENT DOCUMENTS 6,027,535 A * 2/2000 Eberle et al. ............... 320/110
6,337,558 B1 * 1/2002 Yuen et al. .................. 320/107

* cited by examiner

Primary Examiner—Edward H. Tso
Assistant Examiner—Pia Tibbits
(74) Attorney, Agent, or Firm—Frommer Lawrence & Haug LLP; William S. Frommer (57) ABSTRACT

A charging device for a battery pack in which universality is achieved without restrictions imposed by the charging terminal unit of the battery pack, a demand for size reduction can be met, and in which the request for safety and reliability may be met with reduction in production cost. To this end, the battery pack charging device includes an ejection member 14 thrust by a battery pack 60 loaded in a battery pack loading unit 6 to accumulate the elastic force, and a lock member 13 engaged with a mating lock portion 66 to hold the battery pack in the battery pack loading unit. On completion of the charging operation, the locked state by the lock member is annulled and the battery pack is uplifted by the ejection member from the battery pack loading unit.

7 Claims, 11 Drawing Sheets

BATTERY PACK CHARGING DEVICE

BACKGROUND OF THE INVENTION

1. Field of the Invention

This invention relates to a battery pack charging device for charging a battery pack which is loaded on a potable electronic equipment for supplying the DC power thereto.

2. Description of Related Art

A battery pack charging device has a battery pack loading unit, formed as a recess on e.g., a major surface of a casing of the device, for charging the battery pack loaded therein. In general, the battery pack charging device includes a DC power supply circuit, and a current detection circuit, or a control circuit, enclosed in a housing, and also includes, in the battery loading section, a charging electrode terminal member for connection to a charging terminal member of the battery pack, and a communication terminal for exchanging the information with the battery pack. The battery loading section of the battery pack charging device is provided with a detection switch for detecting the loading of the battery pack. When the loading of the battery pack into the battery loading section has been confirmed by the detection switch, the DC current is supplied from the DC power supply to the charging electrode for charging the battery pack.

In general, a lock mechanism for holding the loaded state of the battery pack and a popup mechanism for hoisting the battery pack from within the battery pack holding section are provided in the battery pack loading unit of the battery pack charging device. The lock mechanism includes a lock member including a lock part formed at the foremost part thereof and which is slidably mounted in the casing so as to be biased to be protruded into the battery pack loading unit. When the battery pack is loaded in the battery pack loading unit, the lock part of the lock member is engaged in a lock recess formed in the battery pack to keep the loaded state.

The role of the popup mechanism is usually simultaneously performed by an electrode terminal member connected to the charging terminal member of the battery pack. For example, the free end of the electrode terminal member, formed by e.g., a plate spring, is projected into the battery pack loading unit. In the popup mechanism, when the battery pack is loaded in the battery pack loading unit, the electrode terminal member is connected to a charging terminal member of the battery pack and is thrust by the battery pack to accumulate the force of elasticity. When the charging operation comes to a close and the lock mechanism is actuated, the popup mechanism lifts the battery pack by the force of elasticity to facilitate removal of the battery pack from the battery pack loading unit.

In the above-described battery pack charging device, since the electrode terminal member simultaneously performs the role of the popup mechanism, the shape-related degree of freedom of the charging electrode unit, inclusive of the electrode terminal member, is limited by the structure of the battery pack side charging terminal unit. The conventional battery pack charging device suffers from the drawback that it must be constructed with different structures of the battery pack loading unit, lock mechanism or the charging electrode unit, in keeping with design parameters for outer shapes of the battery pack or design parameters of the charging terminal unit, which design parameters may be variegated depending on the design parameters of the electronic equipment. As a consequence, the conventional battery pack charging device lacks in universality.

Moreover, in the battery pack charging device, respective terminals of the charging terminal unit are reduced in pitch, in keeping with attempts in reducing the size and thickness of electronic equipment, consequent upon the improved performance of the secondary cell, so that the terminals of the charging terminal unit are also reduced in pitch. The conventional battery pack charging device has a drawback that, since each electrode terminal member is usually constructed by a plate spring, which plate spring must be afforded with the function of accumulating sufficient force of elasticity to hoist the battery pack, it is difficult to reduce the size of the battery pack charging device.

Moreover, in the conventional battery pack charging device, each electrode terminal member, formed by a plate spring to perform the popup function, is mounted as it is protruded into the inside of the battery pack loading unit. If, in the battery pack charging device, the battery pack is placed within the battery pack loading unit but is not being charged, the electrode terminal member and the electrode terminal member facing each other need to be kept in the non-connected state in order to prevent e.g., overcharging to maintain safety. If, in the battery pack charging device, burrs are produced or acute protrusions are encountered on the outer periphery of each electrode terminal member, formed by a plate spring, there is raised such a problem that these burrs or protrusions interfere with the guide holes in the casing to produce malfunctions or electrical shorting, or with the operator's fingers during operation or handling.

In order to overcome the above problems, encountered with the battery pack charging device, it may be contemplated to maintain non-conducting states for the respective electrode terminal members or to use a molded cover member for overlying the outer periphery of the battery pack charging device. This solution is difficult to resort to because the respective electrode terminal members are directly contacted with the respective charging terminal members. With the conventional battery pack charging device, it is necessary to take such measures as removing the burrs produced on the outer periphery, or to chamfer the protrusions, by way of post-processing. The necessity of taking these measures as well as the shape-related restrictions accounts for increased costs of the battery pack charging device.

SUMMARY OF THE INVENTION

It is therefore an object of the present invention to provide a battery pack charging device in which the structure-related degree of freedom imposed by the charging terminal unit of the battery pack, as well as safety and reliability, may be improved, and in which the demand for reduction in size and cost of the device is met.

The present invention provides a battery pack charging device in which a battery pack, including a charging terminal unit arranged on a first lateral surface and a mating lock portion on a second lateral surface opposite to the first lateral surface, is loaded in a battery pack loading unit formed as a recess in a major surface of a device casing, from the first lateral surface. The battery pack charging device includes a charging electrode unit arranged on a first lateral surface section of the battery pack loading unit, to which the first lateral surface of the battery pack is abutted, the charging electrode unit being connected to the charging terminal unit of the loaded battery pack, a holder provided to the first lateral surface section of the battery pack loading unit for holding the first lateral surface of the loaded battery pack, a lock member provided on a second lateral surface section opposite to the first lateral surface section of the battery pack loading unit and slidably mounted to the major surface of the device casing, the lock member including a lock portion engaged with the mating lock portion of the loaded battery pack, and an ejection member having one end rotatably carried by a support formed in an inner surface of the device casing and having its other end facing a guide opening formed in the bottom surface of the second lateral surface section of the battery pack loading unit, the ejection member being biased to be intruded into the guide opening.

In the present battery pack charging device, the ejection member is thrust by the battery pack loaded into the battery pack loading unit, so that an elastic force is accumulated in the ejection member. The first lateral surface of the battery pack is held by the holder in this state, while the lock member locks the mating lock portion of the second lateral surface to accommodate the battery pack. When the charging operation comes to a close, the lock member is slid to unlock the mating lock portion from the lock portion, while the ejection member is uplifted from the bottom surface of the battery pack loading unit under the elastic force stored.

In the present battery pack charging device, in which the battery pack loaded in the battery pack loading unit is reliably uplifted by the ejection member, the charging electrode unit can be constructed with a relatively free shape not restricted by the shape of the charging terminal member of the battery pack, thus assuring universality. In the present battery pack charging device, the charging electrode members of the charging electrode unit can be reduced in pitch and size, in keeping with the reduction in size and pitch of the charging terminal members of the battery pack, thus reducing the size of the device. Moreover, the charging electrode members and the charging terminal members can be reliably connected to one another without the risk of erroneous connection, thus improving reliability. Additionally, the post-processing, such as deburring, can be omitted, thus further reducing the production cost.

In the present battery pack charging device, including the ejection member thrust by the battery pack loaded in the battery pack loading unit to accumulate the elastic force therein, and the lock member engaged with the mating lock portion to hold the battery pack in the battery pack loading unit, the locked state by the lock member is annulled, on completion of the charging operation, to uplift the battery pack from the battery pack loading unit, so that the charging electrode unit can be designed to free shape without being restricted by the shape of the charting terminal unit, thus achieving universality. With the present battery pack charging device, the pitch and size of the charging electrode unit and the charting terminal unit can be reduced, while the overall device may also be reduced in size. Moreover, the charging electrode unit and the charging terminal unit mating therewith can be reliably connected to one another, without the risk of erroneous connection, thus improving operational reliability. Additionally, post-processing such as deburring of the respective charging electrode members can be omitted to achieve further reduction in production cost.

DESCRIPTION OF THE PREFERRED EMBODIMENTS

Referring to the drawings, a battery pack charging device 1, according to a preferred embodiment of the present invention, is now explained in detail. The battery pack charging device 1 includes a casing combined from an upper casing 2 and a lower casing 3, both formed of synthetic resin. Within this casing, there are enclosed e.g., a DC power supply circuit unit, a current detection circuit and a control circuit unit. The battery pack charging device 1 includes a power supply terminal unit 4, having a pair of pin terminals 4a, 4b, on the outer rim of the casing, with a power supply cable being connected to the power supply terminal unit. The current is supplied over a power supply cable from an external power supply, not shown, to the DC power supply circuit unit of the battery pack charging device 1. The battery pack charging device 1 is provided with a power supplying unit 5 on a bottom surface 6d of a battery pack loading unit 6, as later explained, and is connected to a relay cord, not shown, for directly relaying and furnishing the current from the external power supply to the equipment to which the battery pack is connected.

To the battery pack charging device 1, a battery pack 60 of a width slightly broader than the battery pack loading unit 6 is loaded in a substantially horizontal state with its foremost part 60a directed slightly downwards. The battery pack charging device 1 is provided with an electrode unit 7 for supplying the charging current to the battery pack loading unit 6 and a loading detection unit 8 for detecting the loading of the battery pack 60. The battery pack 60 is charged in a preset fashion after detecting by e.g., a current detection circuit whether or not the battery pack 60 may be charged. The battery pack charging device 1 is provided with a positioning rib 9 for setting the position of the battery pack 60 loaded in the battery pack loading unit 6 and a stopper projection 10 for prohibiting its extrication. The battery pack charging device 1 is also provided with a lock/eject mechanism 11 for locking the loaded battery pack 60 and for lifting the battery pack 60 from within the battery pack loading unit 6.

The battery pack 60 is used e.g., as a power supply for a video camera, and includes a rectangular casing of a broader width, combined from an upper half 61 and a lower half 62, bot of which are molded from synthetic resin, such as polycarbonate resin. The battery pack 60 includes, in its casing, a chargeable lithium ion secondary cell, in a manner not shown in detail. The battery pack 60 includes its one longitudinal side as a loading surface 60a into the battery pack charging device 1, and has a charging terminal unit 63 on one width-wise side of this loading surface 60a. The charging terminal unit 63 will be explained in detail subsequently.

The battery pack 60 includes a positioning recess 64 which is formed astride the loading surface 60a and the opposite side lateral surface facing the charging terminal unit 63. When the battery pack 60 is loaded in the battery pack loading unit 6 of the battery pack charging device 1, the positioning recess 64 is engaged by the positioning rib 9, so that the battery pack is loaded in position. On an upper surface 60c in proximity to the loading surface 60a of the battery pack is formed an index 65 for demonstrating its loading direction to the battery pack charging device 1. The longitudinal lateral surface of the battery pack 60 opposite to the loading surface 60a of the battery pack 60 is formed as a lock surface 60b which is locked by the lock/eject mechanism 11 when the battery pack 6s is loaded in the battery pack charging device 1. A lock recess 66 is formed in the lock surface 60b.

Figure 15:
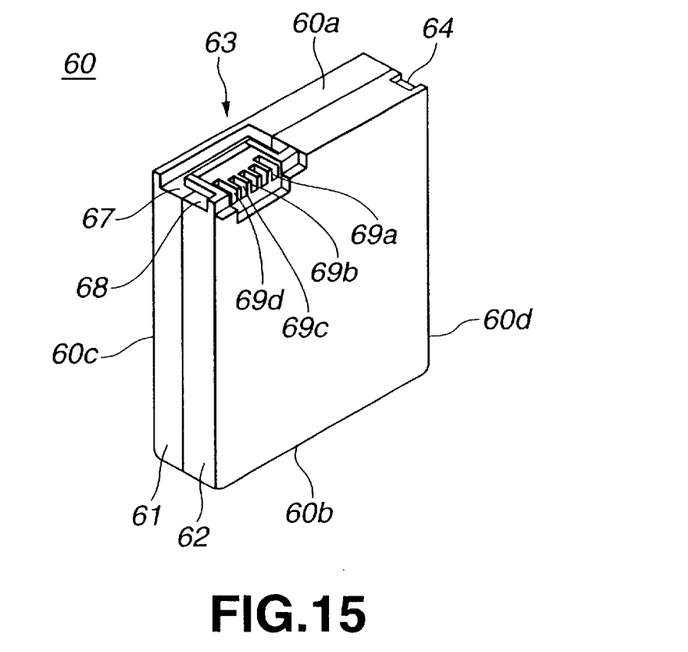
FIG. 15 is a perspective view looking from the bottom side of the battery pack.
Figure 16:
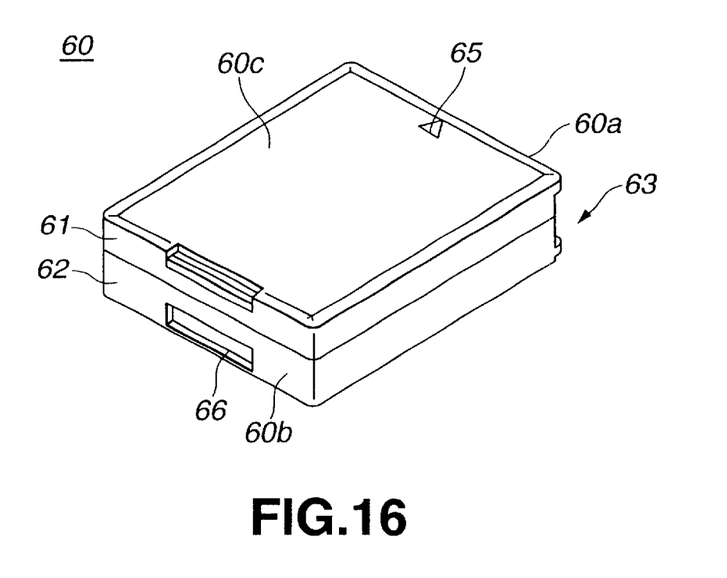
FIG. 16 is a perspective view looking from the upper surface side of the battery pack.

Referring to FIG. 15, the charging terminal unit 63 is provided in a fitting recess 67 formed in the loading surface 60a for opening to a bottom surface 60d and a lateral surface of the battery pack 60, as shown in FIG. 15. The battery pack 60 has its loading surface 60a locked by the fitting recess 67 engaging with the stopper projection 10 when the battery pack 60 is loaded in the battery pack loading unit 6 as will be explained subsequently. The charging terminal unit 63 includes a cathode charging terminal member, a communication terminal member and an anode charging terminal member, each formed of a metal plate. These terminal members are arrayed in this order in the fitting recess 67 from the inner side towards the outer side. Although not shown in detail, the, respective terminal members are arrayed in slits 69a to 69d so as not to be exposed to outside. In the charging terminal unit 63, a convexed protection rib 68 is formed for surrounding a slit site accommodating the respective terminal members.

In the battery pack 60, the respective terminal members of the charging terminal unit 63 are connected to the respective electrode members of the electrode unit 7, by the battery pack charging device 1 being housed in the battery pack loading unit 6, as will be explained subsequently in detail. The battery pack 60 sends the information on design parameters or the charging information through the communication terminal member to the battery pack charging device 1. The charging current is supplied through the cathode charging terminal member and the anode charging terminal member to perform the preset charging on the enclosed secondary cell.

Figure 1:
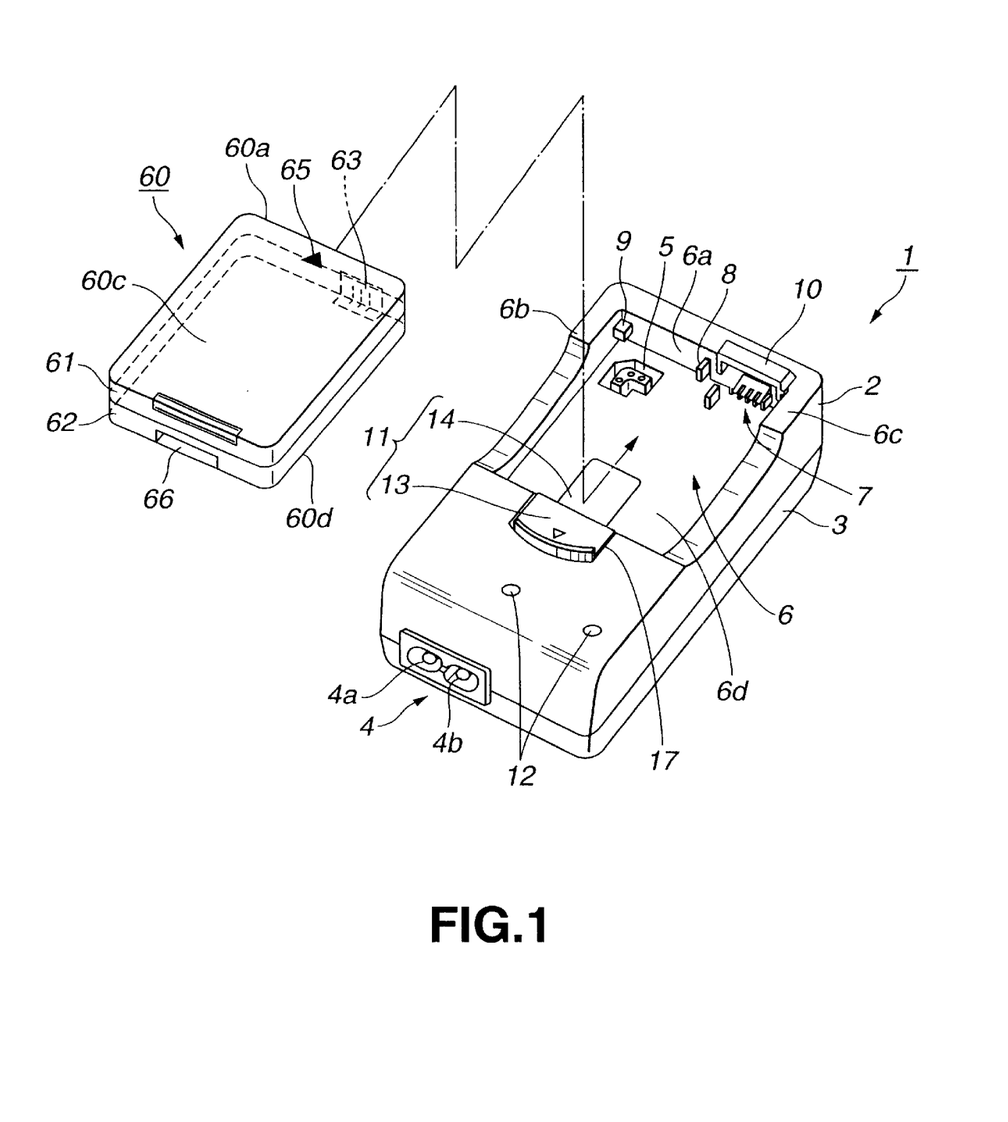
FIG. 1 is a perspective view showing a battery pack charging device embodying the present invention and a battery pack to be loaded on and charged by the battery pack charging device.
Figure 2:
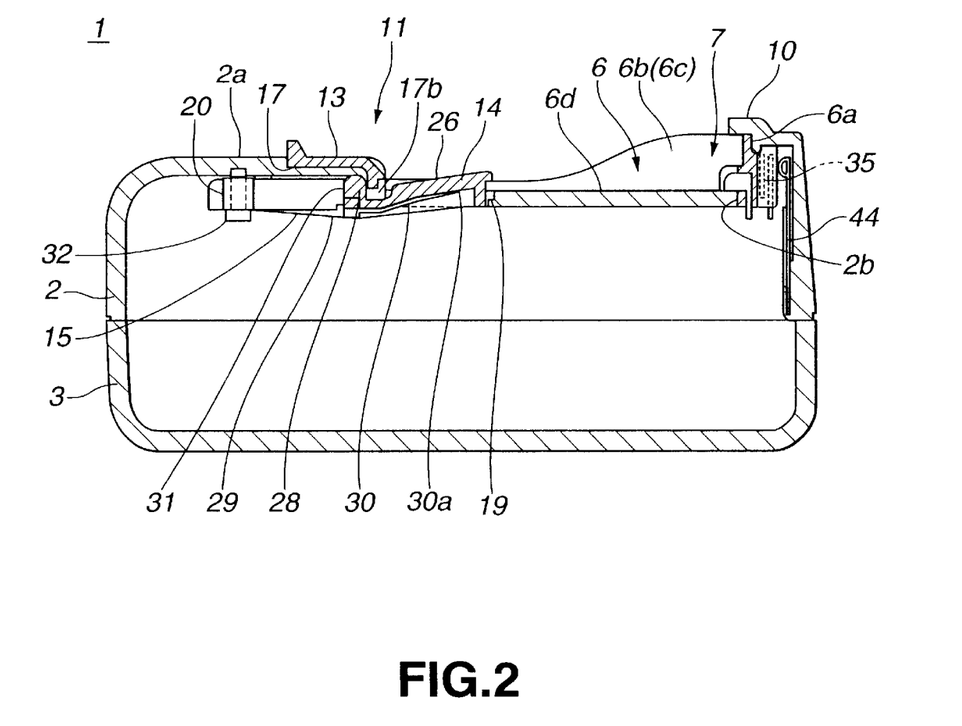
FIG. 2 is a longitudinal cross-sectional view of the battery pack charging device with the inner mechanism thereof being omitted.

The above-described battery pack 60 is loaded into the battery pack loading unit 6, from the loading surface 60a first. The battery pack 60 is positioned in the battery pack loading unit 6 and kept in its loading state. The battery pack loading unit 6 is a rectangular recess substantially corresponding in profile to the outer shape of the battery pack 60 and has a longitudinal lateral side as an abutment surface 6a against which abuts the loading surface 60a of the battery pack 60 being loaded. Referring to FIGS. 1 and 2, the battery pack loading unit 6 has its lateral sidewall sections 6b, 6c formed to an arcuate shape with the height of the lateral sidewall sections decreasing progressively from its loading surface 60a towards a longitudinal mid portion. By this outer shape of the lateral sidewall sections 6b, 6c, the battery pack loading unit 6 permits the battery pack 60 to be readily be gripped from its both sides.

The bottom surface of the battery pack loading unit 6 represents a supporting surface 6d carrying the bottom surface 60d of the battery pack 60 being loaded. The battery pack 60 has a depth corresponding to approximately one half the depth of the battery pack 60, and houses the battery pack 60 therein with the bottom surface 60d of the battery pack 60 resting on the bottom surface 6d of the battery pack 60, with the upper surface of the battery pack 60 being exposed to outside. On the inner surface of the loading surface 60a of the battery pack 60 is arranged the electrode unit 7, towards one longitudinal lateral side of the battery pack, as shown in FIG. 1. The loading detection unit 8 is arranged next to the electrode unit 7, while the positioning rib 9 is formed on the same inner surface towards the opposite side longitudinal lateral side of the battery pack loading unit 6. In the bottom surface 6d of the battery pack loading unit 6, there is provided a power supplying unit 5 in the form of a substantially L-shaped opening, in the vicinity of the positioning rib 9.

The stopper projection 10 is formed as one with the abutment surface 6a of the battery pack loading unit 6 in association with the electrode unit 7. The lock/eject mechanism 11 is provided to an upper surface 2a of the upper half 2 lying opposite to the abutment surface 6a of the battery pack loading unit 6. A display unit 12 is provided on the upper surface 2a of the upper half 2 lying towards its side provided with the power supply terminal unit 4 to display the power supplying state to the equipment connected in circuit and the charging state of the battery pack 60.

The lock/eject mechanism 11 is provided with a lock member 13 for locking the lock surface 60b of the battery pack 60 loaded on the battery pack loading unit 6 and an ejection member 14 for uplifting the battery pack 60 from the battery pack loading unit 6. The lock/eject mechanism 11 includes a spring member 15 combined with the bottom surface side of the ejection member 14 for applying the elastic force thereto and a torsion spring 16 for biasing the lock member 13 towards the battery pack loading unit 6.

Figure 3:
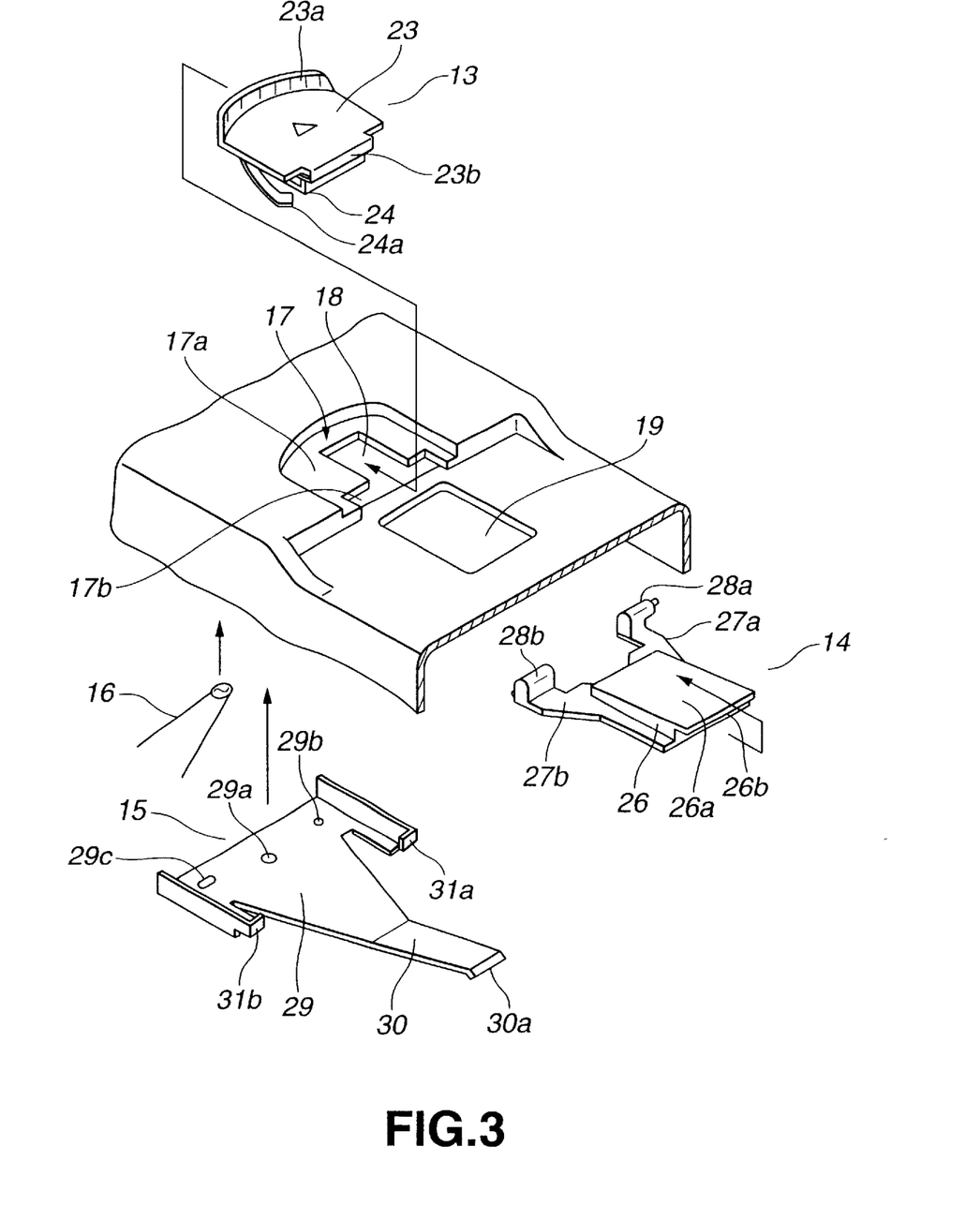
FIG. 3 is an exploded perspective view for illustrating component members of a battery pack lock mechanism and a popup mechanism provided in the battery pack loading unit of the battery pack charging device.
Figure 4:
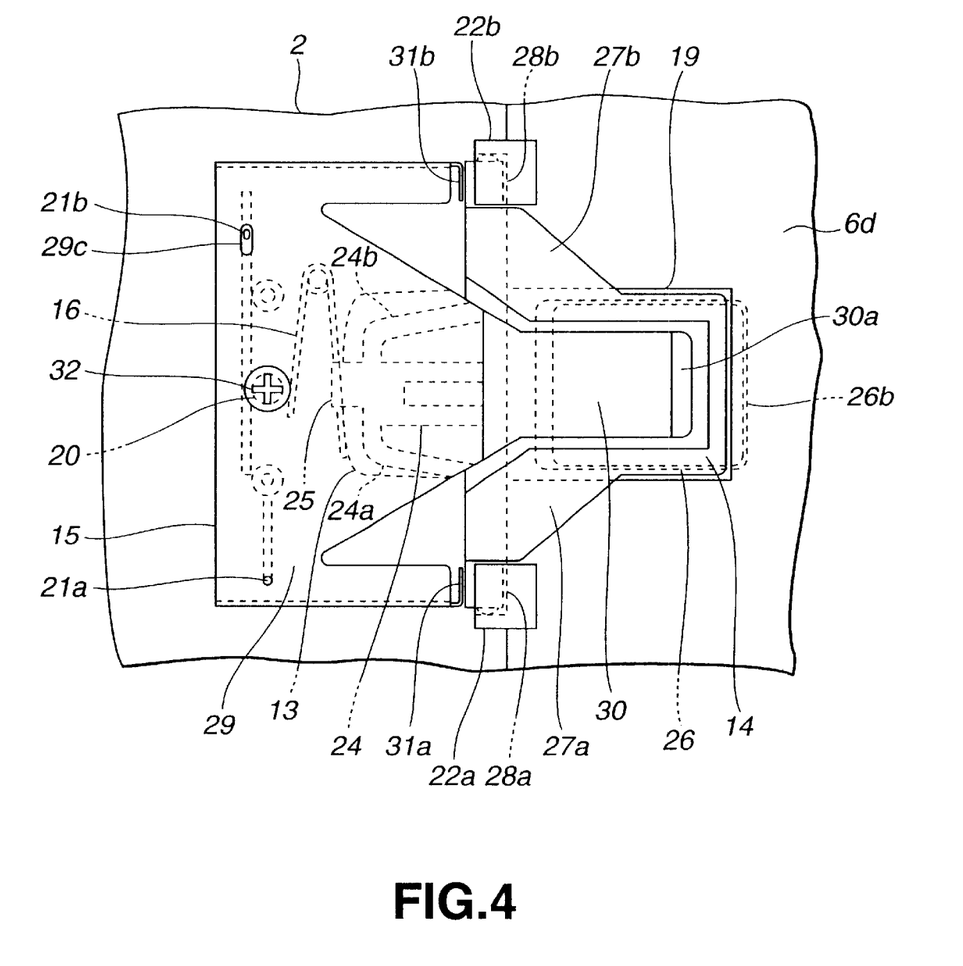
FIG. 4 is a bottom plan view for illustrating the battery pack loading unit.

The upper half 2 is formed with a recess 17 in its upper surface 2a opening to the battery pack loading unit 6 and with a cut-out guide opening 18 in the bottom surface 17a of the recess 17, as shown in FIGS. 2 and 3. The recess 17 is formed with a width-wise cut-out guide opening 17b in its bottom surface 17a for opening to the supporting surface 6d of the battery pack loading unit 6, as shown in FIG. 3. The lock member 13 is assembled to this upper half 2 through the cut-out guide opening 17b for slidably combining the lock member 13 to the recess 17 and to the cut-out guide opening 18. The upper half 2 is formed with a rectangular guide opening 19 in the supporting surface 6d of the battery pack loading unit 6 in association with the recess 17. The ejection member 14 is carried by extending an actuation portion 26 outwards from this guide opening 19. A mounting boss 20 for securing one end of a spring member 15 by a set screw 20 to the inner surface of the upper half 2 is mounted upright on the upper half 2, as shown in FIG. 4.

Figure 5:
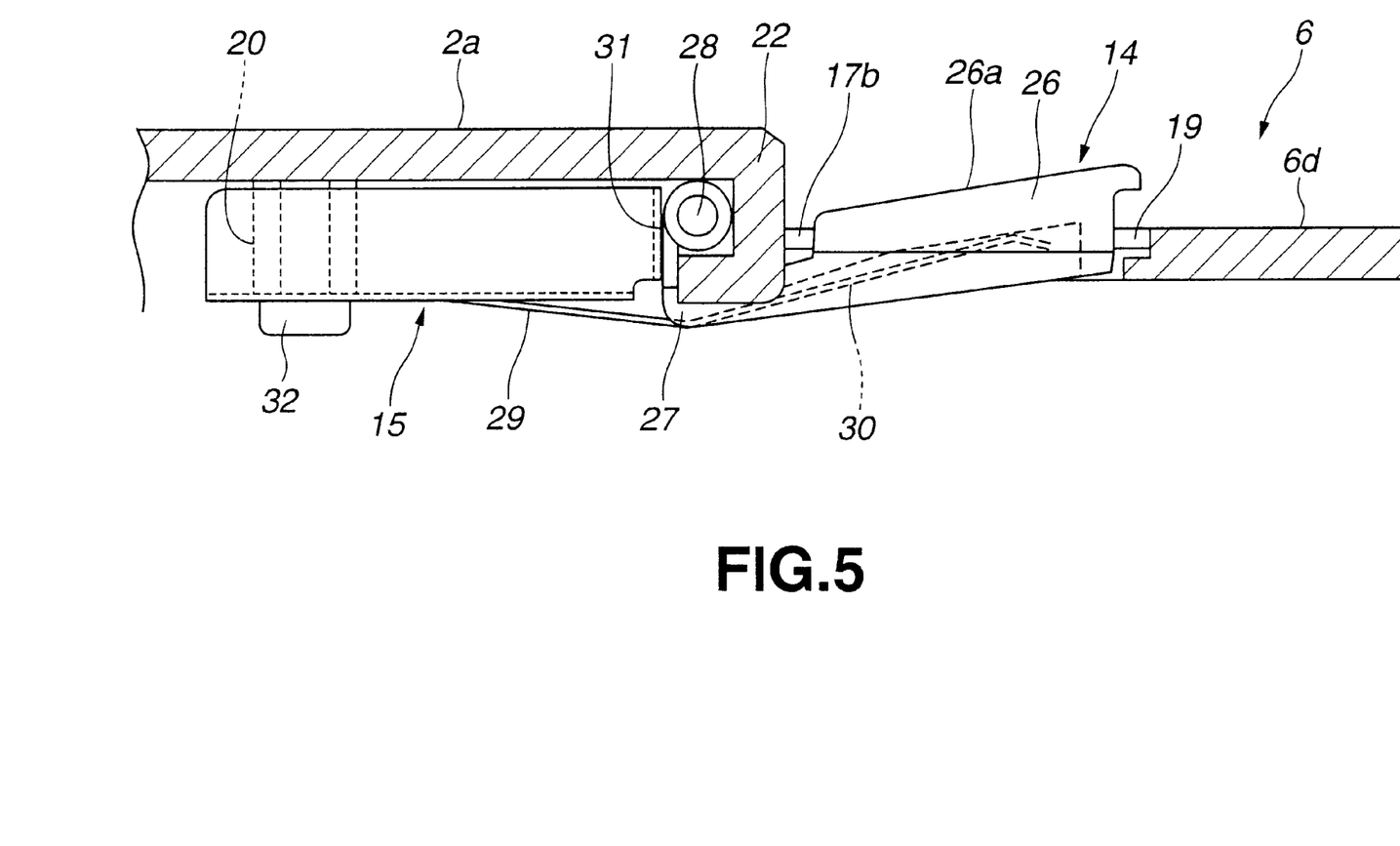
FIG. 5 is a longitudinal cross-sectional view for illustrating the structure of the popup mechanism.

The inner surface of the upper half 2 is formed as one with rib wall section carrying the inner surface of the spring member 15, from a mounting boss section 20. A first positioning projection 21a and a second positioning projection 21b are formed upright on a portion of the rib wall section. Each of plural positioning projections 21 is used for positioning the spring member 15, secured to the mounting boss section 20, as will be described in detail subsequently. The inner surface of the upper half 2 is formed as one with a pair of bearing boss sections 22a, 22b on both sides of the cut-out guide opening 18. The bearing boss sections 22a, 22b are formed as one with the inner surface of the upper half 2 in a spaced apart relation to each other, and is formed with a bearing opening of a substantially U-shaped cross-section, with the open side of the letter U being directed to the mounting boss section 20, as shown in FIG. 5. The bearing boss sections 22a, 22b are adapted for rotatably carrying supporting shafts 28a, 28b formed as one with the ejection member 14 in a manner which will be explained subsequently in detail.

The lock member 13 is formed of synthetic resin as one with an actuation portion 23, a slide portion 24 and a spring retainer 25. The actuation portion 23 has an outer shape substantially corresponding to the opening shape of the recess 17 and a thickness substantially corresponding to the depth of the recess 17. An arcuate-shaped finger support projection 23a is formed at one end of the actuation portion 23. The actuation portion 23 is formed as one with a lock projection 23b on its lateral surface opposite to the finger support projection 23a. The lock projection 23b is a rectangular projection formed in register with a lock recess 66 formed in the lock surface 60b of the battery pack 60, and is adapted for being protruded in the inside of the battery pack loading unit 6 when the lock member 13 is mounted to the recess 17.

The slide portion 24 is formed as one with the lateral surface of the actuation portion 23 carrying the lock projection 23b parallel to the actuation portion 23 with a gap substantially corresponding to the thickness of the recess 17. The slide portion 24 is a plate-shaped section having a width slightly smaller than the groove width of the cut-out guide opening 17b and is formed at its distal end with resilient arm sections 24a, 24b, as shown with a dotted line in FIG. 4. The resilient arm sections 24a, 24b are protruded from the slide portion 24 with an amount of protrusion larger than the groove width of the cut-out guide opening 17b on the whole, with the amount of protrusion progressively increasing from the distal end towards the proximal end of the slide section 24.

The lock member 13 is assembled to the upper half 2 from the battery pack loading unit side, as the resilient arm sections 24a, 24b are converged, by thrusting the slide portion 24 from its distal end first into the cut-out guide opening 17b. On the inner surface of the upper half 2, the torsion spring 16 has its one end retained by the spring retainer 25 of the lock member 13. The torsion spring 16 has its coil portion engaged by the rib formed on the inner surface of the upper half 2, while having its other end retained by the mounting boss section 20, in the compressed state of the torsion spring 16, for causing the lock.member 13 to exert the elastic force towards the battery pack loading unit 6. The lock member 13 is kept in its assembled state by the distal ends of the resilient arm sections 24a, 24b, restored to their natural state, abutting against the inner surface of the cut-out guide opening 17b. The lock member 13 is slidably combined with the recess 17, with the lock projection 23b being protruded into the battery pack loading unit 6 as described above.

The ejection member 14 is formed of synthetic resin as one with an actuation portion 26a, a supporting portion 27 and with a supporting shaft 28, as shown in FIG. 3. The actuation portion 26 is adapted for uplifting the battery pack 60 loaded on the battery pack loading unit 6, and is of an outer shape substantially corresponding to the shape of the guide opening 19. In the state in which the ejection member 14 has been mounted to the upper half 2, the actuation portion 26 is intruded into the guide opening 19 to form a portion of the supporting surface 6d of the battery pack loading unit 6, as shown in FIG. 2. The actuation portion 26 is formed as an inclined surface with its upper surface 26a progressively increasing in height from its distal end towards its proximal end, with an increasing amount of protrusion thereof from the supporting surface 6d of the battery pack loading unit 6, as shown in FIG. 2. The actuation portion 26 has its foremost lateral side formed with s protuberant stopper edge 26b. In the state in which the actuation portion 26 is intruded into the guide opening 19, as later explained, the protuberant stopper edge 26b abuts against the opening edge of the guide opening 19 to prevent descent of the ejection member 14.

The supporting portion 27 is formed on the bottom surface of the actuation portion 26 as a site larger then the guide opening 19 and is formed as one with arm-like projections 27a, 27b towards the proximal end side, as shown in FIGS. 3 and 4. The supporting portion 27 abuts against the opening edge of the guide opening 19 to prevent extrication of the ejection member 14 when the ejection member 14 has been assembled to the upper half 2 from its inner side, with the actuation portion 26 being then intruded from the guide opening 19 into the inside of the battery pack loading unit 6, as will be explained subsequently. The distal ends of the projections 27a, 27b are formed as one with lugs, not shown, the lateral surfaces of which are formed the supporting shafts 28a, 28b. These supporting shafts 28a, 28b are rotatably carried by bearing units 22a, 22b formed on the inner surface of the upper half 2 with a width-wise separation from each other.

The ejection member 14 is rotatably carried by the bearing units 22a, 22b, on the inner surface side of the upper half 2, by the supporting shafts 28a, 28b engaging in the bearing openings from the opened portion. In this state, the ejection member 14 is combined with the upper half 2 by the upper surface 26a of the actuation portion 26 engaging in the battery pack loading unit 6 through the guide opening 19. The ejection member 14 is kept in its assembled state to the upper half 2 by the spring member 15 being mounted to the upper half 2.

The spring member 15 is monolithically formed of metal with a proximal portion 29, an elastic arm 30 and a pair of axial stoppers 31a, 31b, as shown in FIG. 3. The proximal portion 29 is in the form substantially of an isosceles triangle having a bottom side slightly shorter than the width of the upper half 2. A circular first positioning opening 29b and an elongated second positioning opening 29c are formed on both sides of a center mounting opening 29a. An elastic arm section 30 is protuberantly formed from a site of an apex of the proximal portion 29. The elastic arm section 30 is formed as one with the proximal portion 29 from near the apex site thereof and has a length sufficient to extend to near the opening edge of the foremost part of the guide opening 19. The elastic arm section 30 is bent so as to be directed progressively upwards from the proximal portion 29 and has its foremost part arcuately warped downwards to form an abutment portion 30a abutting against the bottom of the actuation portion 26 of the ejection member 14.

The axial stoppers 31a, 31b are formed as convexed pieces of an L-shaped cross-section extending parallel to the elastic arm section 30 along both sides of the proximal portion 29. The axial stoppers 31a, 31b are each of a length such that the foremost part of each of the axial stoppers 31a, 31b faces the bearing unit 22, with the mounting opening 29a as reference. The axial stoppers 31a, 31b are bent at the respective foremost parts so as to face each other to form anti-extraction means for the ejection member 14, as will be explained subsequently in detail.

In the assembled state of the ejection member 14, the spring member 15 is mounted to the inner surface of the upper half 2, as shown in FIG. 4. The spring member 15 has its proximal portion abutted against the inner surface of the upper half 2 as the mounting opening 29a is positioned in register with the mounting boss section 20, the first positioning projection 21a is engaged in the first positioning opening 29b and as the second positioning projection 21b is engaged in the second positioning opening 29c. The spring member 15 has its mounting position adjusted within the lengthwise extent of the second positioning opening 29c and is subsequently mounted to the upper half 2 by a mounting screw 32 which is threaded to the mounting boss section 20.

In this state, the elastic arm section 30 of the spring member 15 is extended towards the guide opening 19, with the abutment portion 30a formed at the foremost part thereof abutting against the bottom surface of the actuation portion 26 of the ejection member 14 for uplifting the actuation portion 26. On the other hand, the distal ends of the axial stoppers 31a, 31b face the bearing units 22a, 22b for closing the opening site of the bearing holes thereof to prohibiting extrication of the supporting shaft 28 of the ejection member 14 carried by the bearing units 22a, 22b.

Figure 6:
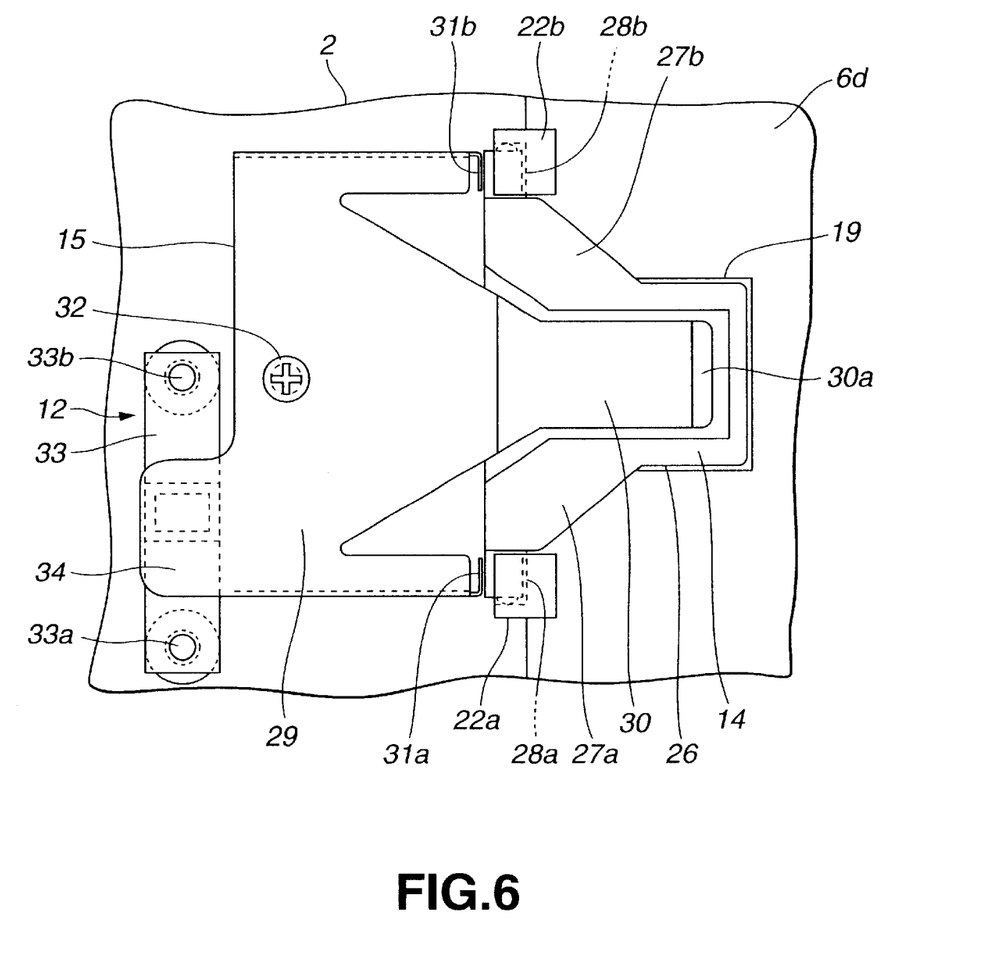
FIG. 6 is a bottom plan view for illustrating essential parts of another embodiment of the battery pack loading unit.

Meanwhile, it is possible for the spring member 15 to have not only the function of holding the ejection member 14 as described above but also the function of operating as a holder for other component members assembled to the upper half 2. The spring member 15 includes a lug 34 formed as one with the bottom side of the proximal portion 29, as shown for example in FIG. 6. The lug 34 holds a light conducting member 33 mounted to the inner surface of the proximal portion 29. The light conducting member 33 is formed of, for example, transparent acrylic resin, and is formed as one with projections in association with light emitting elements 33a, 33b. The light conducting member 33 is mounted to the inner surface of the upper half 2 by the proximal portion 29 fitting in the display opening formed in the upper half 2.

The spring member 15 is assembled to the ejection member 14 as described above, at the same time as it is mounted to the upper half 2 as the light conducting member 33 is mounted thereto. The spring member 15 thrusts the light conducting member 33 against the inner surface of the upper half 2 to hold it by the lug 34 abutting against the bottom surface of the light conducting member 33.

Figure 7:
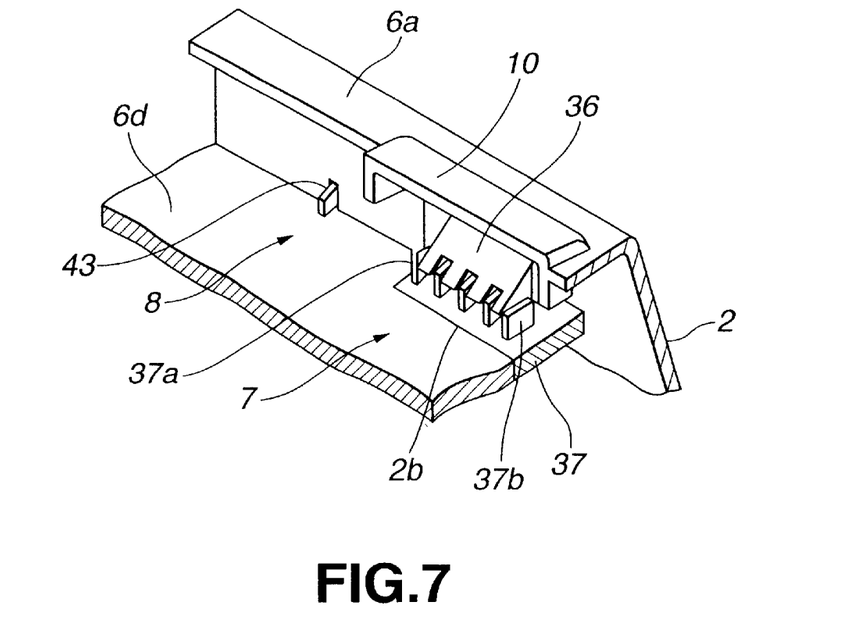
FIG. 7 is a perspective view for illustrating the structure of the charging electrode unit provided in the battery pack loading unit.
Figure 8:
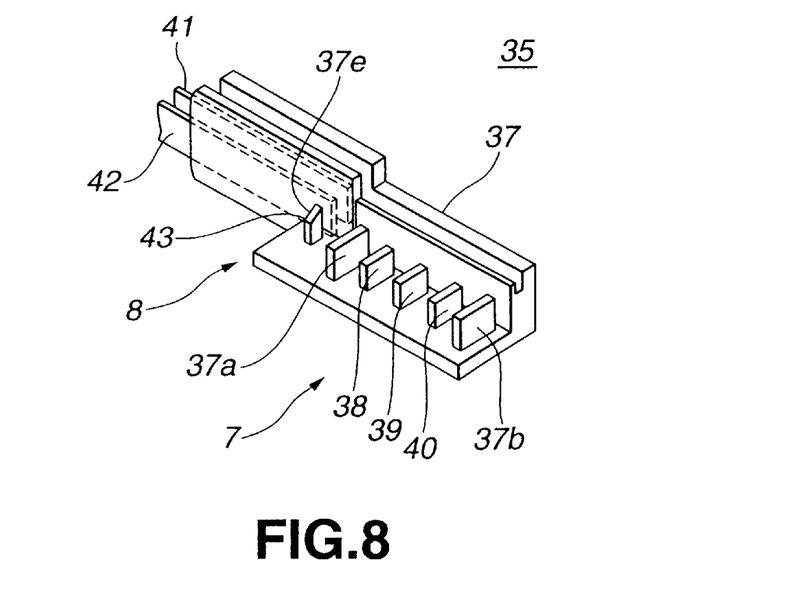
FIG. 8 is a perspective view for illustrating essential parts of an electrode block member provided in the charging electrode unit.
Figure 9:
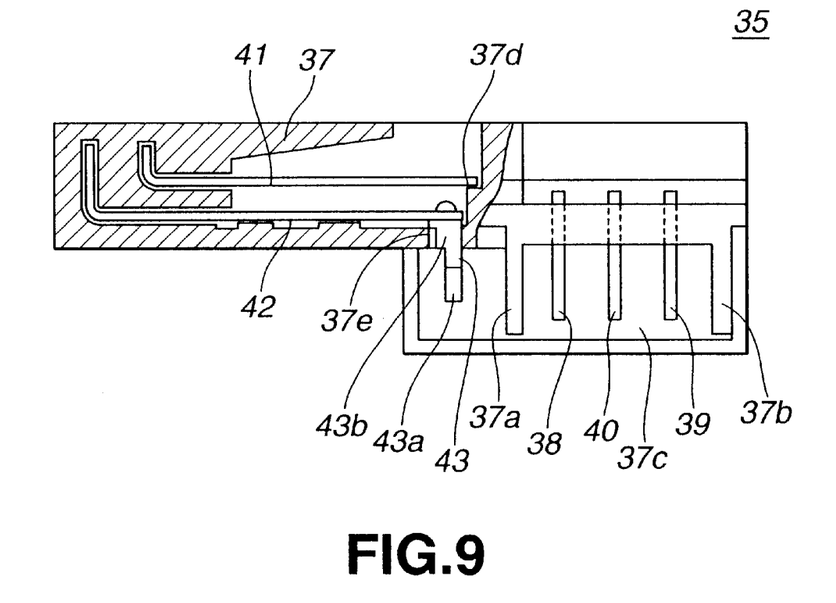
FIG. 9 is a longitudinal cross-sectional view of the electrode block member.
Figure 10:
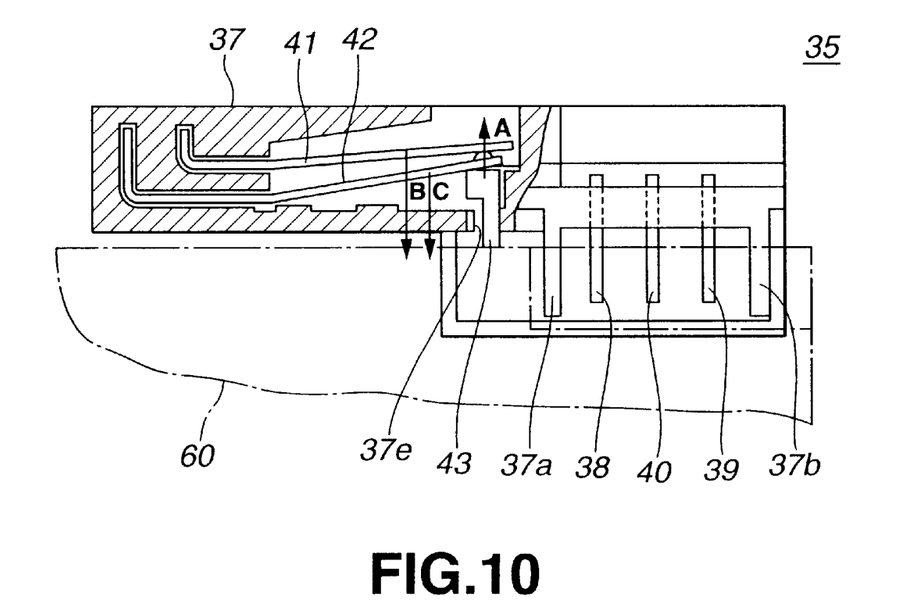
FIG. 10 is a longitudinal cross-sectional view for illustrating the operation of a detection unit provided to the electrode block member for detecting the loading of the battery pack into the battery pack loading unit.
Figure 11:
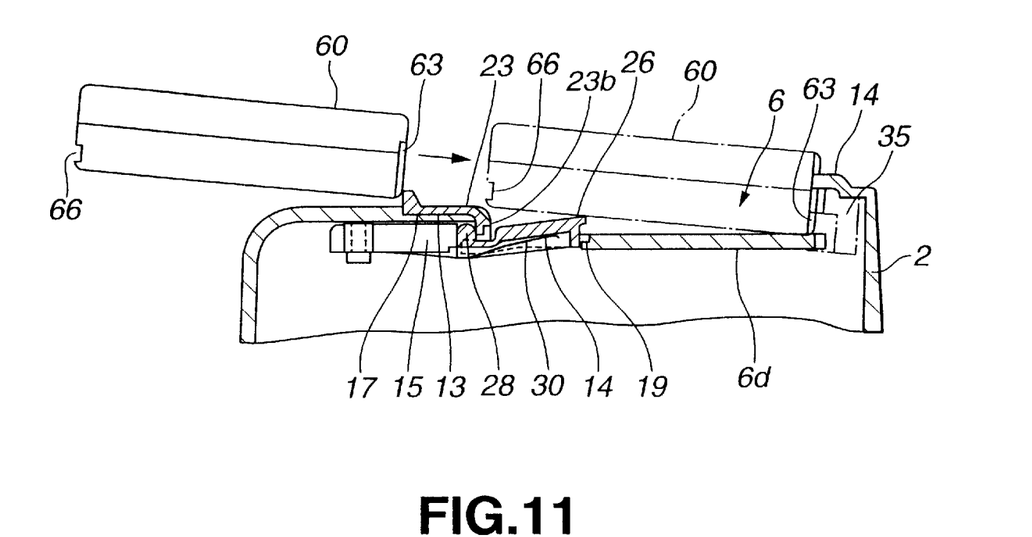
FIG. 11 is a schematic view for illustrating the operation of loading the battery pack to the battery pack loading unit.

The upper half 2 is formed with a cut-out 2b, extending astride the abutment surface 6a and the bottom surface 6d of the battery pack loading unit 6, as shown in FIG. 2. In the cutout 2b of the upper half 2, there are provided an electrode block member 35, forming the electrode unit 7 and the loading detection unit 8, and a shutter member for protecting the electrode unit 7 and the loading detection unit 8, as shown in FIG. 7. Referring to FIGS. 8 to 10, the electrode block member 35 includes a molded frame 37, a cathode electrode member 38, forming the electrode unit, an anode electrode member 39 and a communication terminal member 40, while also including a fixed contact piece 41, a movable contact piece 42 and an actuation member 43.

The electrode block member 35, having the above-mentioned components, is able to unify the electrode unit 7 and the loading detection unit 8 to each other to achieve high precision positioning and mounting of the electrode block member 35 to the upper half 2. The electrode block member 35 is thrust from its back side by a spring plate member 44 mounted to the inner surface of the upper half 2, in a manner free from vibrations, as shown in FIG. 2.

The molded frame 37 is molded from synthetic resin to substantially a plate shape with a certain thickness on the whole, and is mounted to high precision in the cut-out 2b of the upper half 2, by being formed with a mounting recess for mounting to e.g., a circuit substrate, mounted in position to the lower casing 3, or with an arm-like protuberant mounting bracket having a mounting opening. The molded frame 37 is divided in two regions in the longitudinal direction, that is into first and second regions in which the electrode unit 7 and the loading detection unit 8 are arranged, respectively.

The molded frame 37 includes a supporting wall section 37c, extending forwards for forming a portion of the supporting surface 6d of the battery pack loading unit 6, and protective ribs 37a, 37b lying on this supporting wall section 37c on both sides of the electrode unit 7. The protective ribs 37a, 37b are formed by wall-shaped projections larger than the outer shape of the electrode members 38 to 40 as later explained. These protective ribs protect the electrode members 38 to 40 while being engaged in the fitting recess 67 of the battery pack 60 for positioning the positioning ribs 9 and the battery pack 60. The molded frame 37 is formed with an actuation guide 37e for slidably assembling the actuation member 43 to the loading detection unit 8.

In the electrode unit 7, the cathode electrode member 38, anode electrode member 39 and the communication terminal member 40, formed of.metal plates, are insert-molded so that these members face one another with a preset separation from one another and so that the communication terminal member 40 will be arranged at a center position, with the cathode electrode member 38 and the anode electrode member 39 being arranged on its both sides. The cathode electrode member 38, anode electrode member 39 and the communication terminal member 40 are arranged so that the respective upper and foremost parts are protruded into the inside of the battery pack loading unit 6. The cathode electrode member 38 and the anode electrode member 39 are connected to the cathode electrode charging terminal member and to the anode electrode charging terminal member loaded in the battery pack loading unit 6. The communication terminal member is connected to the communication terminal member of the battery pack 60 to exchange the information, such as the specifications information or the charting information, with the battery pack 60.

A fixed contact member 41 and a movable contact member 42 are carried by a site of the loading detection unit 8 extending laterally from the electrode unit 7. Moreover, the actuation member 43, actuated by the battery pack 60, is slidably assembled to the loading detection unit 8. The fixed contact piece 41 and the movable contact piece 42 are fixedly carried at one ends thereof by the molded frame 37 so as to be at right angles to the electrode members 38 to 40 of the electrode unit 7, respectively. The fixed contact piece 41 and the movable contact piece 42 face each other in parallel with a preset distance therebetween. At the fixed ends, the terminal unit is passed through the molded frame 37 so as to be protruded towards the bottom side in the same direction as the terminals of the electrode members 38 to 40. The fixed contact piece 41 is positioned at the free ends thereof by a stopper projection 37d protuberantly formed on the molded frame 37.

The movable contact piece 42 has its one end secured to the molded frame 37 so that the resilient force will be accumulated in the direction of being separated from the fixed contact piece 41. The movable contact piece 42 has its free end faced by an actuation portion 43b of the actuation member 43, as shown in FIG. 9. In case the battery pack 60 is not loaded in the battery pack loading unit 6, the movable contact piece 42 is kept in such a state in which the contacts formed on the inner surface of the foremost part thereof are not contacted with the fixed contact piece 41. Since the force of elasticity is accumulated in the movable contact piece 42, the movable contact piece 42 is prevented form having inadvertent contact with the fixed contact piece 41 even on application of e.g., vibrations.

The actuation member 43 is similarly formed unitarily from synthetic resin, such as polybutylene terephthalate. The actuation member 43 in its entirety is substantially plate-shaped and has its foremost part formed with a cam 43a, while having its rear part formed as actuation portion 43b, in a manner not shown in detail. By the cam 43a being thrust by the battery pack 60 loaded in the battery pack loading unit 6, as will be explained in detail subsequently, the actuation member 43 is slid in a direction parallel to the electrode members 38 to 40 to thrust the movable contact piece 42. In the state in which the battery pack 60 is not loaded in the battery pack loading unit 6, the actuation member 43 abuts against the outer lateral surface of the free end of the movable contact piece 42 and hence is subjected to the elastic force stored in the movable contact piece 42.

When the actuation member 43 is loaded in the battery pack loading unit 6, the cam 43a is thrust onto the loading surface 60a of the battery pack 60. The actuation member 43 is intruded into the inside of the actuation guide 37e, against the force of elasticity of the movable contact piece 42, so that the movable contact piece 42 is elastically displaced by the actuation portion 43b into contact with the fixed contact piece 41 to issue an output detecting the loading of the battery pack 60 in the battery pack loading unit 6.

The actuation member 43 causes elastic displacement of the fixed contact piece 41 through the movable contact piece 42, to maintain the contact state between the fixed contact piece 41 and the movable contact piece 42, as shown in FIG. 10. On the actuation member 43, there act the elastic force, indicated by arrow B, and the elastic force, indicated by arrow C, as shown in FIG. 10.

A shutter member 36 is formed of a synthetic resin material to an arcuate cross-section The shutter member is located below the stopper projection 10, and has its upper portion rotatably supported by the inner surface of the upper half 2. Although not shown, a spring is mounted on a support shaft of the shutter member 36 for biasing it clockwise in FIG. 7. When the battery pack 60 is not loaded in the battery pack loading unit 6, the shutter member 36 is kept in such a state in which it covers the electrode members 38 to 40 to protect these electrode members as well as to prevent dust and dirt from becoming deposited thereon. When the battery pack 60 is loaded in the battery pack loading unit 6, the shutter member 36 is rotated to expose the electrode members 38 to 40 to outside.

Referring to FIGS. 11 to 14, the operation of loading the battery pack 60 to the battery pack charging device 1 and of ejecting it therefrom is explained. The battery pack 60 is loaded into the battery pack loading unit 6 from the loading surface 60a, as the battery pack is slightly tilted relative to the upper surface 2a of the upper half 2, as indicated by arrow in FIG. 11. The battery pack 60 is positioned in such a manner that, as the loading surface 60a of the battery pack 60 is abutted against the abutment surface 6a of the battery pack loading unit 6, as indicated by a chain-dotted line in FIG. 11, the stopper projection 14 is engaged with the fitting recess 67 to hold the loading surface side, with the positioning rib 9 engaging with the positioning recess 64, for positioning the battery pack 60.

In the battery pack charging device 1, when the battery pack 60 descends in the battery pack loading unit 6, with the lock surface 60b first, the lock member 13 is slid within the recess 17, against the force of the torsion spring 16, under the thrust exerted by the lock surface 60b. When the stopper projection 23a is slid on the lock surface 60b until facing the lock recess 66, the lock member 13 is slid under the elastic force of the torsion spring 16, whereby the stopper projection 23a is engaged with the lock recess 66.

Figure 12:
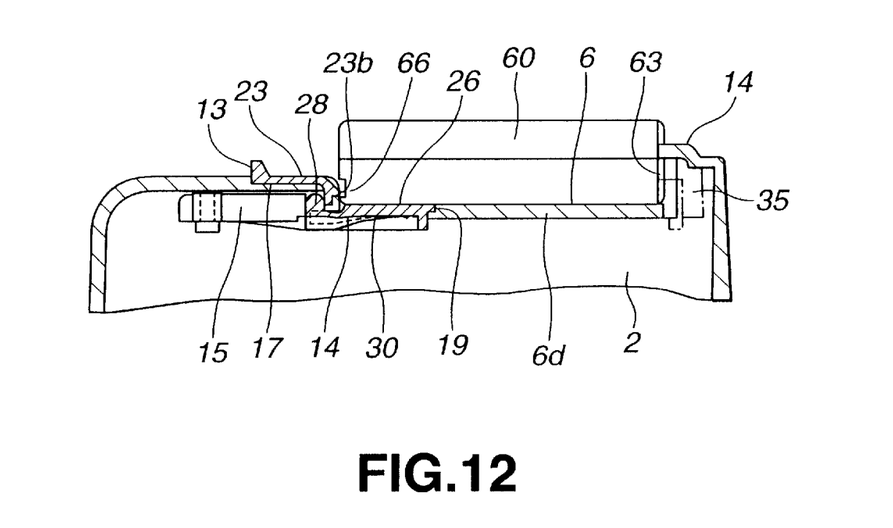
FIG. 12 is a schematic view showing the state of loading the battery pack in the battery pack loading unit.

In the battery pack charging device 1, the ejection member 14 is rotated clockwise in FIG. 12, about the supporting shafts 28a, 28b as the fulcrum, as a consequence of the actuation portion 26 being thrust by the battery pack 60 loaded in the battery pack loading unit 6. Thus, the actuation portion 26 is thrust inwards from the guide opening 19. By the stopper projection 26b abutting against the opening edge of the guide opening 19, the actuation portion 26 is substantially flush with the supporting surface 6a of the battery pack loading unit 6 to support the bottom surface 60d of the battery pack 60. The ejection member 14 during its rotation causes downward resilient movement of the elastic arm section 30 of the spring member 15 applied to its inner side. To the ejection member 14, there is applied the elastic force operating in the counterclockwise direction from the spring member 15 in FIG. 12.

When the battery pack charging device 1 is loaded in the battery pack loading unit 6, its loading surface 60a of the battery pack 60 is held by the stopper projection 14, while its lock surface 60b is held by the lock member 13. In the battery pack charging device 1, the elastic force of the spring member 15 is applied to the bottom surface 60d of the battery pack 60, through the ejection member 14, while the elastic force of the fixed contact piece 41 and the movable contact piece 42 is applied to the loading surface 60a through the actuation member 43.

Figure 13:
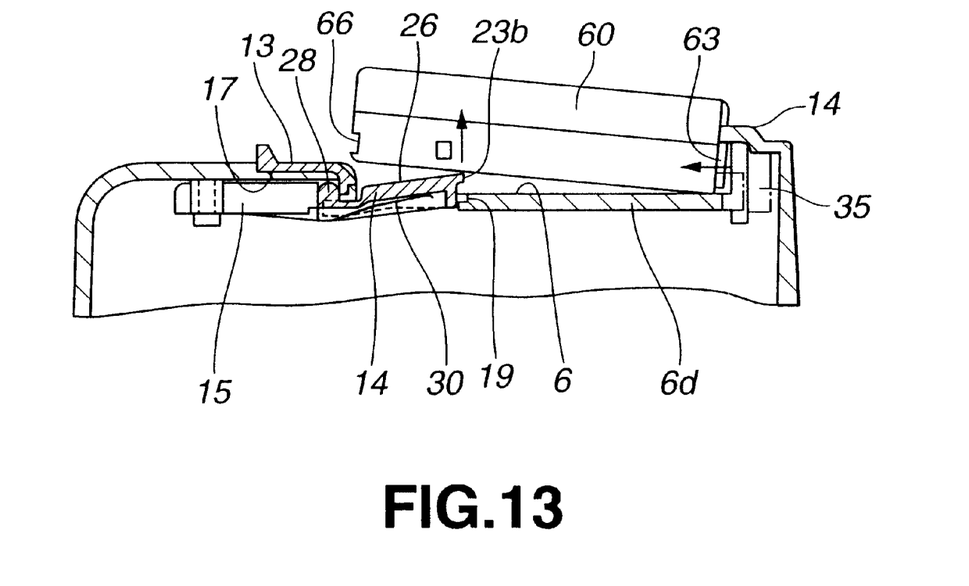
FIG. 13 is a schematic view for illustrating the operation of unlocking the battery pack locked by a lock member.

When the charging operation for he battery pack 60 by the battery pack charging device 1 has come to a close, the lock member 13 is slid towards left in the recess 17 in FIG. 13 against the force of the spring member 15. With the lock member 13, thus slid, the stopper projection 23b of the actuation portion 23 is extricated from the lock recess 66 to unlock the lock surface 60b of the battery pack 60. In the battery pack charging device 1, the actuation portion 26 is protruded via guide opening 19 into the inside of the battery pack loading unit 6, under the force of the spring member 15, as shown in FIG. 13. The ejection member 14 uplifts the lock surface 60b of the battery pack 60, as indicated by arrow in FIG. 11.

Figure 14:
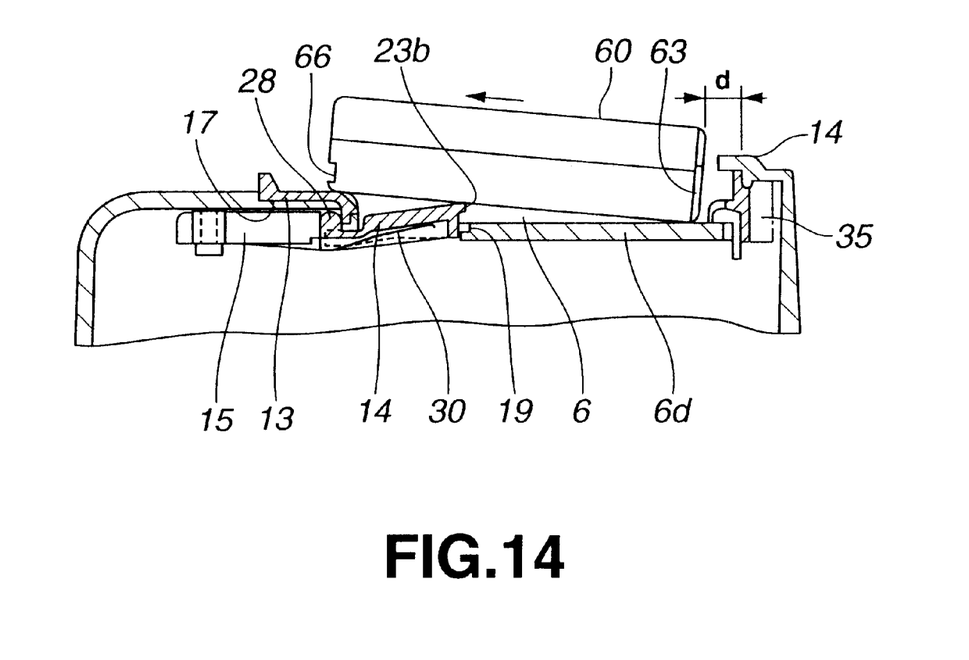
FIG. 14 is a schematic view for illustrating the battery pack popup operation.

In the battery pack charging device 1, the elastic force of the fixed contact piece 41 and the movable and the contact piece 42 is applied to the loading surface 60a of the battery pack 60 through the actuation member 43. By the side of the lock surface 60*b* being opened, the battery pack 60 is thrust by the actuation member 43 in a direction indicated by arrow in FIG. 13. This causes the battery pack 60 to be moved in its entirety in the battery pack loading unit 6 towards the lock/eject mechanism 11, as indicated by arrow in FIG. 14. In the battery pack charging device 1, the charging terminal unit 63 is separated from the electrode unit 7, by such movement of the battery pack 60, as shown in FIG. 14. In the battery pack charging device 1, the shutter member 36 is restored to its initial position to keep the electrode unit 7 and the charging terminal unit 63 separated from each other.

In the battery pack charging device 1, the operation of the actuation member 43 in causing the movement of the battery pack 60 towards the lock/eject mechanism 11 by the actuation portion 26 being rotated in sliding contact with the bottom surface 60*d* of the battery pack 60.

What is claimed is:

1. A battery pack charging device in which a battery pack, including a charging terminal unit arranged on a first lateral surface and a mating lock portion on a second lateral surface opposite to said first lateral surface, is loaded in a battery pack loading unit formed as a recess in a major surface of a device casing, from said first lateral surface, comprising:

a charging electrode unit arranged on a first lateral surface section of the battery pack loading unit, to which the first lateral surface of the battery pack is abutted, said charging electrode unit being connected to said charging terminal unit of the loaded battery pack;

a holder provided to the first lateral surface section of said battery pack loading unit for holding the first lateral surface of the loaded battery pack;

a lock member provided on a second lateral surface section opposite to said first lateral surface section of said battery pack loading unit and slidably mounted to the major surface of said device casing, said lock member including a lock portion engaged with said mating lock portion of the loaded battery pack; and an ejection member having one end rotatably carried by a support formed in an inner surface of said device casing and having its other end facing a guide opening formed in the bottom surface of said second lateral surface section of said battery pack loading unit, said ejection member being biased to be intruded into said guide opening; wherein said battery pack having said first lateral surface held by said holder in said battery pack loading unit as the battery pack thrusts said ejection member to accumulate the elastic force therein, said battery pack being accommodated as said second lateral surface is locked by said lock member; and wherein said lock member is slid in this state to unlock the mating lock portion from said lock portion, said battery pack being uplifted from the bottom surface of the battery pack loading unit under the elastic force accumulated in said ejection member.

2. The battery pack charging device according to claim 1 further comprising:

an elastic member for biasing said ejection member which is made up by a proximal portion secured to a mounting portion formed in the inside of said casing and an elastic arm section protruded as one from the proximal portion into abutment against the other end of said ejection member for biasing said ejection member so as to be protruded through said guide opening of said battery pack loading unit.

3. The battery pack charging device according to claim 2 wherein a structure for rotatably supporting one end of said ejection member by a supporting portion of said casing includes a supporting shaft formed as one with the casing and fitted in a substantially U-shaped bearing hole of a bearing unit formed as one with said casing, with an opening part of said bearing hole, in which is fitted said supporting shaft, being closed by a shaft stopper formed as one with the proximal portion of said elastic member.

4. The battery pack charging device according to claim 1 wherein elastic means is provided to said first lateral surface of said battery pack loading unit and wherein the elastic force of said elastic means causes the sliding of said lock member to cause the battery pack uplifted by said ejection member to be moved towards said second lateral surface.

5. The battery pack charging device according to claim 1 wherein a detection switch is arranged on said first lateral surface section for detecting the loading of said battery pack, said detection switch including an actuation member biased to be intruded into the battery pack loading unit, said actuation member performing a switching operation in a state in which the actuation member is elastically biased by being thrust by the first lateral surface of said battery pack, the elastic force accumulated in said actuation member causing the sliding of said lock member to cause the battery pack uplifted by said ejection member to be moved towards said second lateral surface section.

6. The battery pack charging device according to claim 5 wherein a cut-out is formed in the first lateral surface section of said battery pack loading unit and wherein a terminal block member comprised of a plurality of charging electrodes forming said charging electrode unit and the detection switch unified thereto is assembled in said cut-out.

7. The battery pack charging device according to claim 1 wherein a communication terminal member that can be connected to a communication terminal provided to the first lateral surface of said battery pack is provided to said charging electrode unit.

* * * * *